April 26, 1949.  F. R. EPP  2,468,435
GLARE SHIELD
Filed July 9, 1947
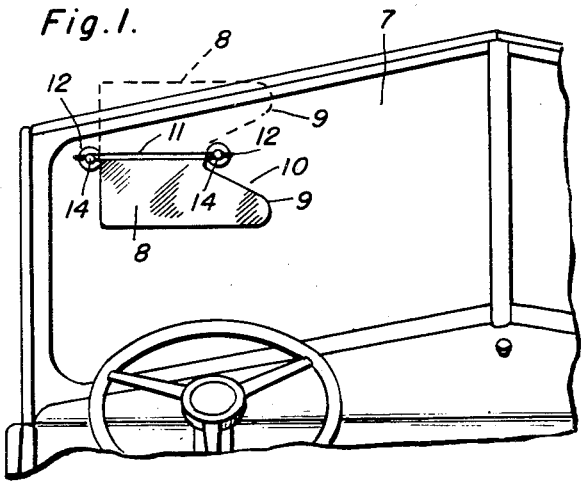
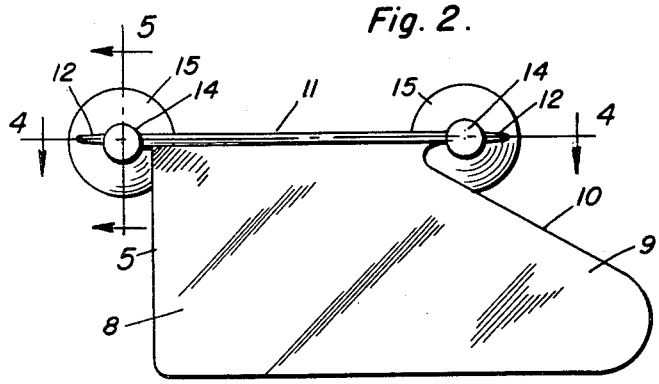
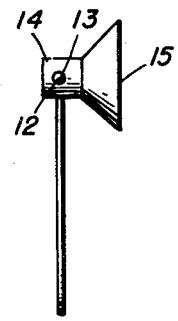
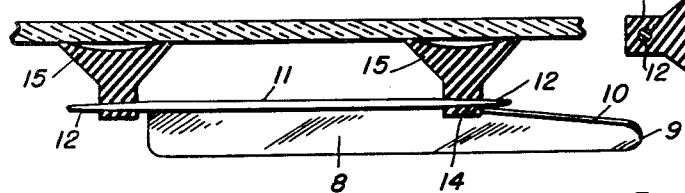
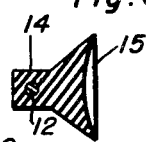
Inventor
Francis R. Epp
By Clarence A. O'Brien
and Harvey B. Jacobson
Attorneys Patented Apr. 26, 1949

2,468,435

UNITED STATES PATENT OFFICE 2,468,435

GLARE SHIELD

Francis R. Epp, Altoona, Wis.

Application July 9, 1947, Serial No. 759,833

2 Claims. (Cl. 296—97)

The present invention relates to an improved glare shield such as is adapted to be mounted on an automobile windshield and used whenever necessary or desired, to intercept blinding rays from the sun or those from oncoming headlights, or reflected beams from shiny road and equivalent surfaces.

Needless to say, I am sufficiently conversant with the art to which the invention relates to full well appreciate that the use of interceptor-type anti-glare shields are notoriously old and are generally characterized by a suitably shaped panel of transparent material appropriately colored, and means being provided whereby the shield is hingedly attachable to an automobile windshield. As a matter of fact, the art to which the invention relates shows that it is not new to employ suction cups and to so construct same that hinge pintles on a glare shield are hingedly or otherwise operatively connected thereto.

Briefly, the present invention has to do with a simple arrangement characterized by a pair of a ordinary type suction cups, these being attached to the windshield and having shank portions to accommodate attaching and hinging members on the ends of the rocker shaft portion of a transparent shield forming panel.

The object of the invention is to taper the hinge members in such a manner that the bearing equipped portions of the suction cups may be slipped on or off in a manner to either allow for free rocking motion of the panel, or to bind it sufficiently that it will stay in place either in a "down" or "up" position.

Other objects and advantages will become more readily apparent from the following description and the accompanying illustrative drawing.

In the drawing, wherein like numerals are employed to designate like parts throughout the views:

Figure 1 is a perspective view showing a portion of an automobile and the windshield with the glare shield, constructed in accordance with this invention, attached to the windshield;

Figure 2 is an elevational view with the details illustrated on a scale sufficiently large for clear comprehension of same;

Figure 3 is an end view of Figure 2 at right angles to said figure; and

Figures 4 and 5 are horizontal and vertical sections, respectively, on the lines 4—4 and 5—5 of Figure 2, looking in the direction of the arrows.

Referring now to the drawing and to Figure 1, the windshield glass is denoted by the numeral 7 and is conventional. The transparent plastic or equivalent glare shield panel is denoted by the numeral 8 and is for the most part rectangular in general form and is provided at the right-hand end with a gradually narrowed extension 9 having an inclined edge 10 providing clearance to facilitate clear vision in and around the area, that is, the marginal portions, of the shield. The so-called "upper" edge of the shield is somewhat reinforced as at 11 to provide a sort of a rocker shaft and the ends of the rocker shaft are tapered as at 12 to provide attaching and hinging pintles. The pintles are adapted to extend through bearing holes 13 formed in the projecting portions 14 of the suction cups 15. There are two such cups and they are identical in construction.

In practice, the suction cups are attached to the windshield to position the glare shield at the point illustrated in Figure 1. The main novelty in this construction is a one-piece plastic panel with a reinforced edge portion 11 forming a rocker shaft and having tapered pintles 12 at opposite ends, these fitting adjustably in bearing holes in the extensions on attaching members, the suction cups 15 shown in the drawings.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A structure of the class described, in combination, a relatively fixed automobile windshield, a transparent glare shield opposed in parallelism to the windshield, a pair of suction cups detachably and adjustably mounted on said windshield, said suction cups being provided with central projections, said projections being of post-like form and apertured to provide bearings, said glare shield being provided at transverse ends with outstanding projections forming axles, said axles being hingedly connected, by way of said bearings, with said post-like projections, said axles being in the form of pintles and said pintles being longitudinally reduced in diameter, tapered and pointed at their outer ends, said suction cups being movable on said pintles toward and from each other in order to either bind or loosen the pintles in a manner to allow the glare shield to be maintained in relatively fixed position or loosened and freely swung up to a relatively fixed out-of-the-way position.

2. The structure defined in claim 1, said shield being essentially rectangular in shape and having an outwardly narrowing wing-like extension at one transverse end.

FRANCIS R. EPP.

REFERENCES CITED

The following references are of record in the file of this patent:

FOREIGN PATENTS

| Number | Country | Date |
|---|---|---|
| 323,618 | Great Britain | Jan. 9, 1930 |
| 328,554 | Great Britain | Apr. 23, 1930 |